April 25, 1967     R. A. GROAT     3,315,661

CERVICAL SCRAPERS

Filed Sept. 24, 1964

INVENTOR,
RICHARD A. GROAT

BY Watson, Cole, Grindle & Watson
ATTORNEYS

United States Patent Office 3,315,661
Patented Apr. 25, 1967

3,315,661
CERVICAL SCRAPERS
Richard A. Groat, Box 6536, Greensboro, N.C. 27405
Filed Sept. 24, 1964, Ser. No. 399,026
5 Claims. (Cl. 128—2)

This invention relates to improvements in an instrument designed to scrape or remove cells from the body, or to gather exfoliated cells, so that they may be interpreted pathologically after suitable processing.

The improvements of the present invention, although primarily designed to adapt the instrument for use in obtaining material from the cervix of the uterus, are by no means limited to this specific use, since the invention includes features making the instrument particularly useful also in the collection of material from other organs or areas of the body.

As applied to the cervix, the improved scraping instrument of the invention is employed in a novel manner to scrape material from the area of the cervix susceptible to cancer, this being hereinafter designated and referred to as the "target area," by inserting the instrument into the cervical canal to the optimal distance and twisting it. The instrument is so designed that its laterally opposed side scraping edges, when received in the cervical canal, tend to stretch or distend same in the plane of the edges and thus cause the cervical mucosa to be firmly pressed against the suitably sharp edges of the scraper blade, so that when the instrument is rotated or twisted about its longitudinal axis, cells will be scraped from the cervical mucosa of the target area and collected on the instrument for retrieval and study.

The combined stretching and scraping actions are unique and mutually contribute to a most efficient scraping and retrieval of material from the specific target area comprising the external os and adjoining lower cervical canal. It differs markedly from the action of instruments of the type which involve placement of a pivotal portion into the external os or lower cervical canal so that another portion of the instrument may be revolved over the ectocervix with the intention of scraping the latter. In such an instrument, the portion placed in the external os or lower cervical canal is used simply as a pivot to guide the other portion intended to scrap cells from the ectocervix. Scraping action with such an instrument depends upon the instrument being firmly pressed manually by the operator against the surface to be scraped, and this limits the effectiveness of the instrument because the ectocervix is movable as related to the applied pressure and thus offers little resistance against which the scraping force can be exerted. Such an instrument is not designed to scrape the target area for the scraping of which the instrument of the instant invention is designed, which target area is not the ectocervix.

Similarly, the invention and the principles on which it operates differ from instruments of the type which involve placement within the lower cervical canal of a blade adapted for scraping, but which, because it does not stretch the cervix, depends for its scraping action upon the blade being firmly pressed manually by the operator against the surface to be scraped. This limits the effectiveness of the instrument because the lower portion of the cervix is readily movable or yieldable with the pressure applied in this manner and thus offers little resistance against which the scraping force can be exerted.

With these considerations in mind, it is the primary object of the present invention to provide an instrument by the use of which scraping of the desired target area is effectively accomplished by the easily executed maneuvers of inserting the appropriate portion of the instrument into the lower cervical canal and twisting the instrument.

In order to achieve this object, I provide the instrument with a flat blade carried at one end of an elongated shank or handle and having a pair of laterally outwardly directed side scraping edges extending rearwardly from its leading end symmetrically to its longitudinal axis which is preferably coincident with the axis of the shank. The width of the blade portion between these edges is chosen to be greater than that of the cervical canal in which it is to be inserted so that when it is inserted, it will stretch the cervix in the plane of the blade and the inherent elasticity of the cervical tissue will press the cervical mucosa against the side scraping edges to provide a resistance against which an effective scraping action may be exerted simultaneously by both edges incident to the twisting of the instrument about its longitudinal axis.

Also in accordance with a further feature of the invention, the side scraping edges are provided with rearwardly diverging continuations adapted for scraping engagement with the cervix in the region of the external os, which will, incidentally, be firmly supported due to the stretching action of the inserted blade portion within the cervical canal to increase the effectiveness of the resulting scraping action. These side edge diverging continuations achieve the added function of limiting the depth of insertion of their associated blade portion into the cervical canal.

It is a further important feature of the invention to provide the scraper instrument with a dual blade or blades, preferably such dual blades being carried at the respective ends of its shank and comprising blade portions in a plurality of widths, so selected that at least one such blade portion will be proportioned for proper coaction with any cervix likely to be encountered.

It is a further feature of the invention to arrange each such dual blade that the blade portion at its leading or distal end is of less width than the next adjoining blade portion rearwardly thereof, so that the blade may be inserted within the cervical canal to the extent necessary to position the blade portion of proper width within the cervical canal. When the maximum width blade portion is thus inserted, with the smaller width leading portion extending up into the cervical canal in advance of it, the distending action of the greater portion will also contribute to the avoidance of any vigorous scraping action by the narrower blade portion in the portion of the cervical canal beyond the target area, where such action is not desired, due to the possibility of producing bleeding which could interfere with the gathering of material from the target area.

In the accompanying drawings in which there is illustrated the preferred embodiment of the invention:

Figure 1:
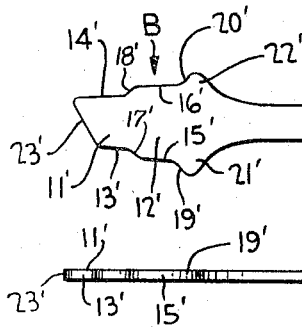
FIGURE 1 is a plan view of a cervical scraper incorporating the improved features of the invention in both of the scraper blades carried thereby.
Figure 2:
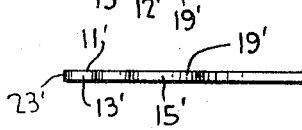
FIGURE 2 is a side elevation of the instrument shown in FIGURE 1.

Referring now in detail to the accompanying drawings, and first considering the specific structure of the scraper or instrument depicted in FIGURES 1 and 2, it will be noted that the scraper comprises an elongated shank 10 to function in the manner of a handle for manipulation of the raper. In the present instance such shank 10 is provided with flat blades A and B, at its opposite ends, and each blade preferably is a dual blade. Thus the blade A has a leading blade portion 11 of minimum width, while the trailing blade portion 12 is of greater width than portion 11. The blade B at the opposite end of the shank 10 is similar in all respects to the blade A, except as to its proportions. In the blade B, the leading blade portion 11' of somewhat greater width than blade portion 12 of blade A, trailing blade portion 12 is of still greater width than blade portion 11'.

It will thus be apparent that the two blades A and B jointly contain a total of four blade portions of successively increasing widths. These widths are so selected that one of the several blade portions will cooperate properly with a cervix of any size likely to be encountered.

The scraper of the invention, including the shank and blades, is adapted for integral formation preferably as a specially shaped thin and flat paddle of uniform thickness, and may be formed of wood, plastics, or in fact any suitable material having sufficient rigidity to adapt it for the uses herein described.

Since the blades A and B differ only as to dimensions and are otherwise similar in all respects, it will suffice to describe but one such blade, namely the blade A, in detail, it being understood that the detailed description will apply also to the blade B in which corresponding portions are designated with similar but primed reference characters.

Thus, referring particularly to blade A, its leading blade portion 11, which is of a predetermined minimum width, is formed to present a pair of longitudinally extending and laterally outwardly directed side scraping edges 13 and 14 respectively, while the trailing blade portion 12 has similarly disposed side scraping edges 15 and 16. Both of these side scraping edges of each blade portion are symmetrical to a common longitudinal axis which coincides with that of the shank 10 and extend preferably to the plane of the flat blade for the full thickness thereof so as to be dull and incapable of cutting action when employed in the manner hereinafter described.

Although the said side scraping edges of each blade portion extend longitudinally, as above mentioned, it has been found desirable to have each pair of edges 13, 14, 15 and 16 taper or converge very slightly toward the leading end of the blade A, since this convergence insures the best contact of the scraping edges with the wall of the lower cervical canal.

The side edges 13 and 14 of leading blade portion 11 merge with rearwardly diverging continuations 17 and 18 respectively. These continuations also merge smoothly with the forward ends of side scraping edges 15 and 16 and thus provide a smooth transition section at the juncture of the blade portions 11 and 12.

The side scraping edges 15 and 16 of the blade portion 12 similarly merge rearwardly with the rearwardly and outwardly diverging continuations 19 and 20. These last continuations in the preferred embodiment constitute forwardly presented edges of lateral shoulders or projections 21 and 22 adjacent the juncture of the blade A with the shank 10.

Figure 3:
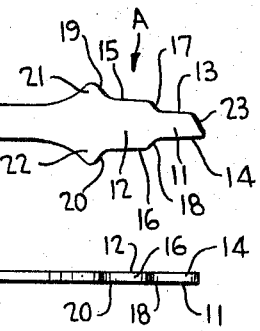
FIGURES 3 to 6 and 8 to 11 are similar views illustrating diagrammatically and in section the portion of a human body containing the cervix, and illustrating in different views various of the ways in which the invention may be employed, the scraper of the invention in each of these views being shown fragmentarily only.
Figure 3:
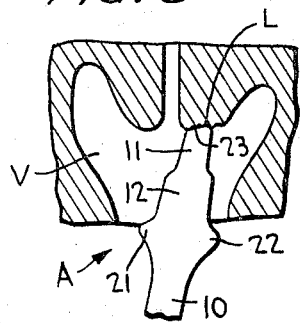
Figure 9:
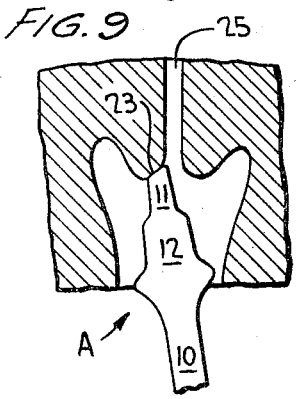

It is desirable that the leading end edge 23 of the blade A be inclined diagonally to the longitudinal axis of the blade in order better to adapt it for use in the ways exemplified in FIGURES 3 and 9, and also in order to facilitate insertion of the blade into the lower cervical canal.

Figure 7:
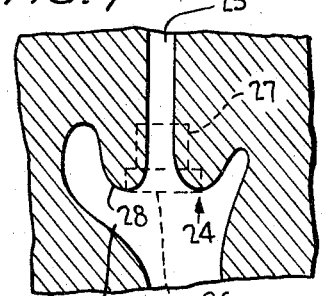
FIGURE 7 is a diagrammatic sectional view through the cervix of the human body in which the target area from which the scraper of the invention is specifically adapted to recover material is designated, the scraper itself being omitted from this view for purposes of clarity.

Referring now to FIGURE 7 in the diagrammatic sectional illustration there shown, the letter V designates the vagina (shown in part only) of a human body. The cervix is designated generally by the numeral 24, and the cervical canal is shown at 25. The particular target area from which the scraper of the invention is especially adapted to scrape and retrieve material includes the region 26 of the external os and the immediately adjoining lower end portion 27 of the cervical canal 25.

Figure 8:
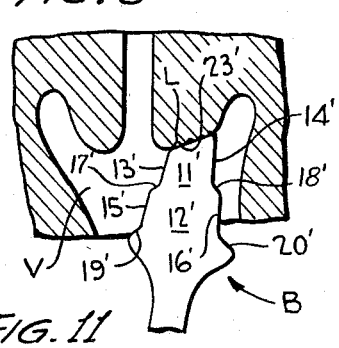

Although the inventive features and improvements are intended primarily to adapt the scraper for retrieval of material from this target area, it is to be understood that the invention is also well adapted for retrieval of material from the ectocervix 28 by the use of its diagonal end portions or edges 23, 23' as shown in FIGURES 3 and 8 respectively.

In the use of the invention to recover material from the target area above described, the blade portion of appropriate width with respect to the cervix from which the material is to be scraped, is inserted into the cervical canal until its continued insertion is limited by engagement of its rearwardly diverging edge continuations or shoulders 17–18, 19–20 or 17'–18', 19'–20' with the region of the external os.

Figure 5:
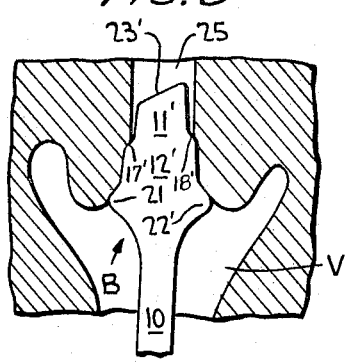
Figure 6:
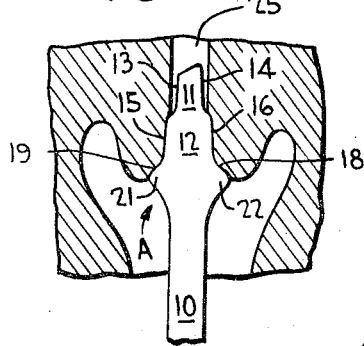
Figure 10:
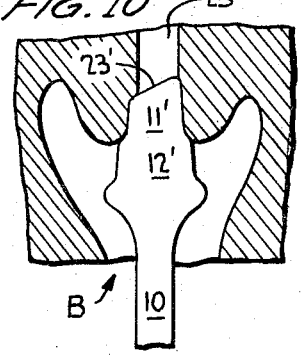
Figure 11:
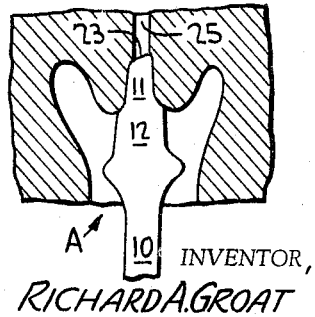

Assuming that the blade portion 11 of blade A is employed, then it will be operatively positioned at this time in the cervical canal in the manner shown in FIGURE 11, with the shank 10 and its longitudinal axis aligned with the canal. Its diverging edge portions or continuations 17 and 18, having thus limited the insertion of the blade portion into the canal, will be in firm scraping engagement with the cervix in the region of the external os. Being of greater width than the cervical canal 25, the blade portion 11 will necessarily exert a lateral stretching upon the cervix. Thus the side scraping edges 13 and 14 will press outwardly against the cervical mucosa within the canal, and the inherent elasticity of the tissue of the cervix will urge it firmly against these edges. Thus, twisting of the instrument about its longitudinal axis will result in efficient scraping and removal of material from the cervical mucosa within the lower portion of the canal 25. The anatomical attachments of the cervix will prevent it from twisting with the instrument. The stretching or distending action of the blade portion will firmly support the cervix to withstand the endwise pressure exerted against the cervix in the region of external os 26 by continuation edge portions or shoulders 17 and 18.

Where the smaller width blade portion 11' of blade B is employed, as in FIGURE 10, its manner of use will be identical with that just described.

Where the relatively wider blade 12 or 12' is to be employed, the action will be as indicated in FIGURES 5 and 6 respectively of the drawing, and for this reason, the following explanation is restricted to a description of the operation of blade portion 12, as shown in FIGURE 6, with the understanding that it applies equally to blade portion 12', inasmuch as the primed reference characters indicate parts which correspond in structure and function with the similarly numbered but unprimed parts now referred to in FIGURE 6.

Thus, if the wider trailing blade portion 12 of the instrument is to be used, the blade A is inserted fully into the cervical canal 25 until the diverging edge portions or continuations 19 and 20 engage the cervix in the region of the external os. The engagement of the interior wall of the canal 25 by the scraping edges 15 and 16 will stretch and expand the cervix to secure the superior scraping action by both the edges 15, 16 and their diverging continuations or shoulders 19 and 20, in the manner described in connection with blade portion 11.

Figure 4:
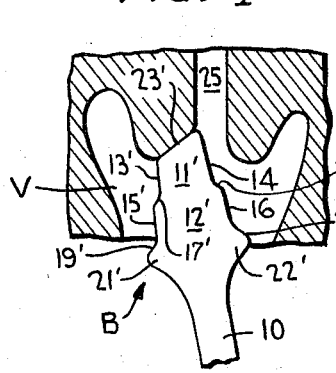

The diagonal end edges 23, 23' at the distal ends or extremities of the instrument, alone or in conjunction with scraping edges 14 and 14', may be employed if desired to achieve additional scraping in the region of the external os, the instrument in such event being positioned substantially as shown in FIGURES 4 and 9. In this manner of use, however, the scraping will not be as effective in most instances as where the cervix is stretched by insertion of one of the blade portions.

In the event there is a visible lesion on the cervix, as indicated by the reference character L in FIGURES 3 and 8, such lesion may be scraped with the diagonal straight edge, such as 23 or 23', by utilization of the instrument in the manner indicated in these figures. In addition, either end of the instrument is adapted for use in dipping material from the vaginal pool in the usual manner. It will be also apparent that lesions elsewhere on the body, for instance on the skin or in the oral cavity, may readily be scraped with the improved instrument of the invention.

In this application I have shown and described only the preferred embodiment of my invention, in order to disclose the preferred mode known to me of practicing the invention. However, I realize that the invention is capable of other and different embodiments, and of numerous variations as to detail, all without departing from the invention. Accordingly, it is to be understood that the invention is entitled to such modifications and variations as fall within the scope of the appended claims.

Having thus described my invention, I claim:

1. A cervical scraper comprising an elongated shank, a flat blade at one end of said shank adapted for insertion into the lower cervical canal of a human body, said blade comprising a leading blade portion of predetermined width and a relatively wider trailing blade portion between said leading blade portion and the shank; said blade portions having a common longitudinal axis aligned with said shank; each said blade portion having a pair of laterally outwardly directed blunt side scraping edges extending longitudinally rearwardly thereof from its leading end, and rearwardly diverging continuations of said side edges projecting outwardly from a common longitudinal location spaced from the leading end of said portion, said diverging side edge continuations of the leading blade portion merging smoothly with the side scraping edges of both portions, said side edges and said diverging side edge continuations extending normally to the plane of said flat blade for the full thickness thereof so as to be dull and incapable of cutting, the width of one of said blade portions between its side scraping edges being greater than that of the cervical canal into which it is to be inserted, to stretch the cervix in the plane of said blade so that inherent elasticity of the cervical tissue will press the cervical mucosa against the side scraping edges of said one blade portion, to provide a resistance against which an effective scraping action may be exerted incident to twisting of the scraper about its longitudinal axis, the diverging edge continuations of said one blade portion limiting the insertion thereof into the cervical canal and exerting a scraping action on the external os incident to said twisting of the scraper.

2. A cervical scraper as defined in claim 1 in which the distal end of said leading blade portion includes a rectilinear scraping edge extending diagonally to said longitudinal axis and interconnecting its side scraping edges, and wherein the stretching action of the said one blade supports the external os for firm scraping engagement by said diverging edge continuations.

3. A cervical scraper comprising an elongated shank, a pair of scraper blades respectively carried at the opposite ends of said shank for insertion into the lower cervical canal of a human body, each said blade comprising a leading blade portion of predetermined width and a relatively wider trailing blade portion between said leading blade portion and the shank; said blade portions having a common longitudial axis aligned with said shank; each said blade portion having a pair of laterally outwardly directed side scraping edges extending longitudinally rearwardly thereof from its leading end, and rearwardly diverging continuations of said side edges, said continuations of each leading blade portion merging smoothly with the side scraping edges of both portions of each blade, said leading blade portion of one said scraper blade being wider than either blade portion of the other said blade.

4. A cervical scraper comprising a flat blade adapted for insertion into the lower cervical canal of a human body, said blade comprising a leading blade portion of predetermined width and a relatively wider trailing blade portion; said blade portions having a common longitudinal axis; each said blade portion having a pair of laterally outwardly directed side scraping edges extending longitudinally rearwardly thereof from its leading end, and rearwardly diverging continuations of said side scraping edges equidistantly spaced from the leading end of said portion, said diverging side edge continuations of the leading blade portion being at the junction of both blade portions and merging smoothly with the side scraping edges of both said portions, the width of one of said blade portions between its side scraping edges being greater than that of the cervical canal into which it is to be inserted, to stretch the cervix in the plane of said blade, and said side scraping edges and side edge continuations extending normally to the plane of said flat blade for the full thickness thereof so as to be dull and incapable of cutting during normal usage of said scraper.

5. A cervical scraper comprising an elongated shank, a flat blade at one end of said shank adapted for insertion into the lower cervical canal of a human body, said blade comprising a blade portion of predetermined width greater than that of the cervical canal in which it is to be inserted; said blade portion having its longitudinal axis aligned with that of said shank; said blade portion having a pair of laterally outwardly directed side scraping edges extending longitudinally rearwardly thereof from its leading end, symmetrically to said longitudinal axis, and terminating at its distal end in a rectilinear scraping edge extending diagonally to said longitudinal axis, and rearwardly diverging continuations of said side edges projecting outwardly from a common longitudinal location spaced from the leading end of said blade portion, whereby insertion of the blade portion into said cervical canal of lesser width than the blade portion will stretch the cervix in the plane of said blade so that inherent elasticity of the cervical tissue will press the cervical mucosa against the side scraping edges of said one blade portion, to provide a resistance against which an effective scraping action may be exerted incident to twisting of the scraper about its longitudinal axis, the diverging edge continuations of said one blade portion limiting the insertion thereof into the cervical canal and exerting a scraping action on the external os incident to said twisting of the scraper, the stretching action of the said one blade meanwhile supporting the os for firm scraping engagement by said diverging edge continuations.

References Cited by the Examiner

UNITED STATES PATENTS

| 1,249,240 | 12/1917 | Summers | 77—72 |
| 2,471,088 | 5/1949 | Ayre | 128—304 |
| 3,088,454 | 5/1963 | Shute | 128—304 |

FOREIGN PATENTS

| 144,214 | 1/1936 | Austria. |

RICHARD A. GAUDET, *Primary Examiner.*

K. L. HOWELL, *Assistant Examiner.*